Figure 1:
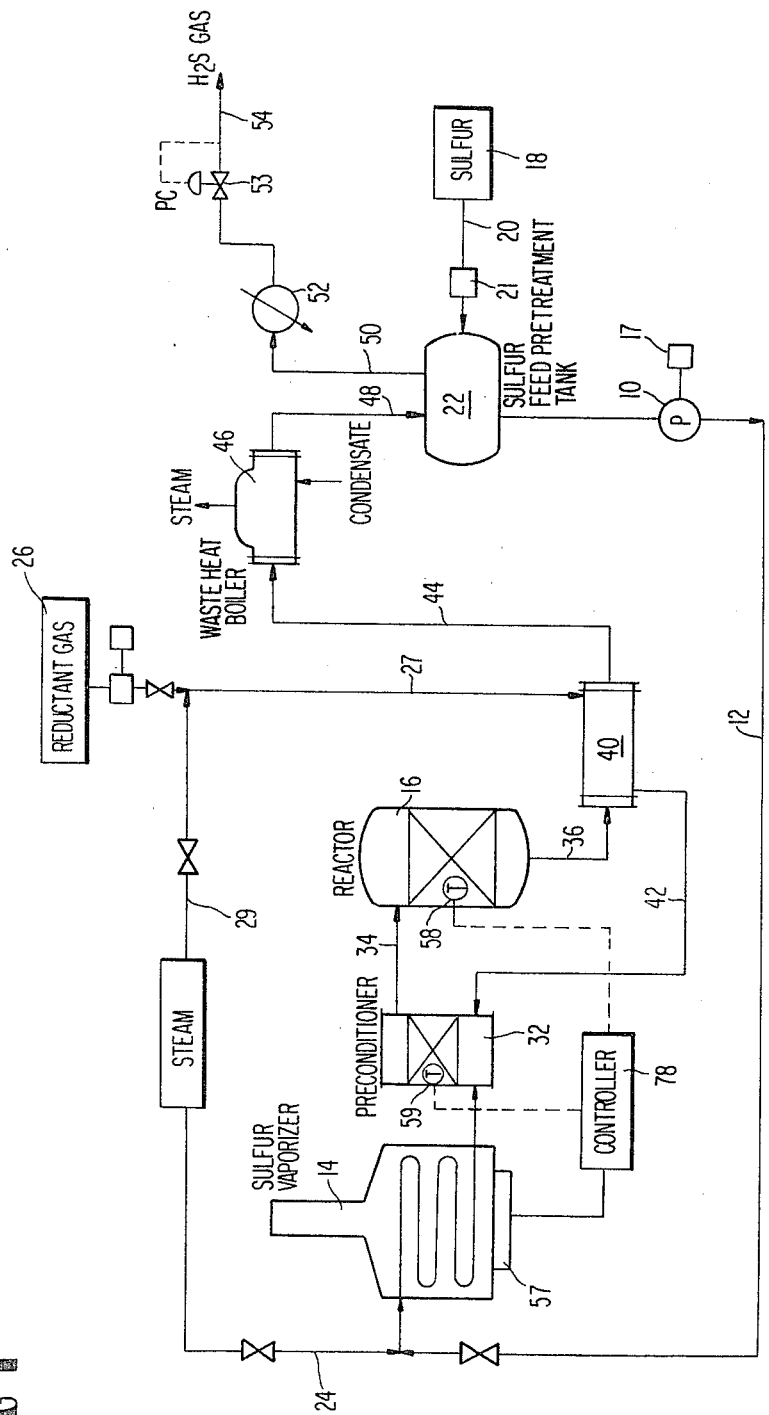

United States Patent [19] [11] 4,332,774
Drum et al. [45] Jun. 1, 1982

[54] MANUFACTURE OF HYDROGEN SULFIDE

[75] Inventors: Ian Drum, Calgary, Canada; Richard S. Madenburg, Boise, Id.; Douglas M. Paulsrude, Eugene, Oreg.; Carroll H. Sherman, Monaca, Pa.; Frank G. Turpin, Boise, Id.; Gerry A. Wheatcroft, Calgary, Canada

[73] Assignees: Home Oil Company Limited, Calgary, Canada; Morrison-Knudsen Company, Inc., Boise, Id.

[21] Appl. No.: 179,528

[22] Filed: Aug. 19, 1980

[51] Int. Cl.$^3$ .................... C01B 17/16; C22B 17/00; C22B 21/00; C01G 9/00
[52] U.S. Cl. .................... 422/111; 422/109; 422/160; 422/235; 423/564; 423/DIG. 5
[58] Field of Search ......... 423/563, 564, 565, DIG. 5; 422/160, 161, 108, 109, 111, 235

[56] References Cited

U.S. PATENT DOCUMENTS

| | | | |
|---|---|---|---|
| 2,214,859 | 9/1940 | Maude et al. | 423/565 |
| 2,474,066 | 6/1949 | Preisman | 423/564 |
| 2,876,071 | 3/1959 | Updegraff | 423/563 |
| 3,286,992 | 11/1966 | Armeniades et al. | 423/DIG. 9 |
| 3,312,529 | 4/1967 | Evano | 423/DIG. 5 |
| 3,506,715 | 4/1970 | Clark | 422/109 |
| 3,961,035 | 6/1976 | Mickley | 423/564 |
| 4,059,745 | 11/1977 | Gaertner | 423/DIG. 5 |
| 4,094,961 | 6/1978 | Beavon | 423/564 |
| 4,100,266 | 7/1978 | Smith | 423/DIG. 5 |
| 4,213,955 | 7/1980 | Casciani et al. | 423/DIG. 5 |
| 4,290,110 | 9/1981 | Makovec | 422/111 |

OTHER PUBLICATIONS

Fanelli, Rocco, Solubility of Hydrogen Sulfide in Sulfur 1 & EC, vol. 41 #9, pp. 2031-2033., Sep. 49.
Fanelli, Rocco, Modifying the Viscosity of Sulfur 1 & EC, vol. 38 #1, pp. 39-43, Jan. 46.
Wherry et al., Guide to Profitable Computer Control, Hydrocarbod Processing, Gulf Publishing Co., 1968, pp. 69-72.

Primary Examiner—Gary P. Straub
Attorney, Agent, or Firm—Shanley, O'Neil and Baker

[57] ABSTRACT

Methods and apparatus adaptable to continuous production of hydrogen sulfide from chemical reaction of sulfur with various gaseous sulfur-reducing reactants selected from hydrocarbons, carbon monoxide, carbon-containing compounds such as carbon disulfide, hydrogen, of mixtures of such gases are provided utilizing a fired process sulfur heater to vaporize liquid sulfur feed stock.

Control of the temperature of the sulfur vapors and the amount of liquid sulfur feed are used to modulate sulfiding reaction temperatures.

Viscosity of the liquid sulfur feed stock is modified by contact with product gases in order to facilitate flow rate control as liquid sulfur is pumped into the sulfur vaporizer where its temperature increases above about 300° F.

Steam for hydrolysis purposes is introduced with the sulfur vapors, to augment temperature modulation of the sulfiding reactions, and/or with the reductant gas to assist in heat recovery from the reaction product gases.

The system is operated at pressures above atmospheric as determined by a back pressure established in removing hydrogen sulfide product gases. Controlled movement of reactants and reaction product gases through the system is achieved without mechanical flow control equipment in any of the relatively high temperature zones approaching sulfiding reaction temperatures or sulfur vaporizing temperature.

6 Claims, 4 Drawing Figures

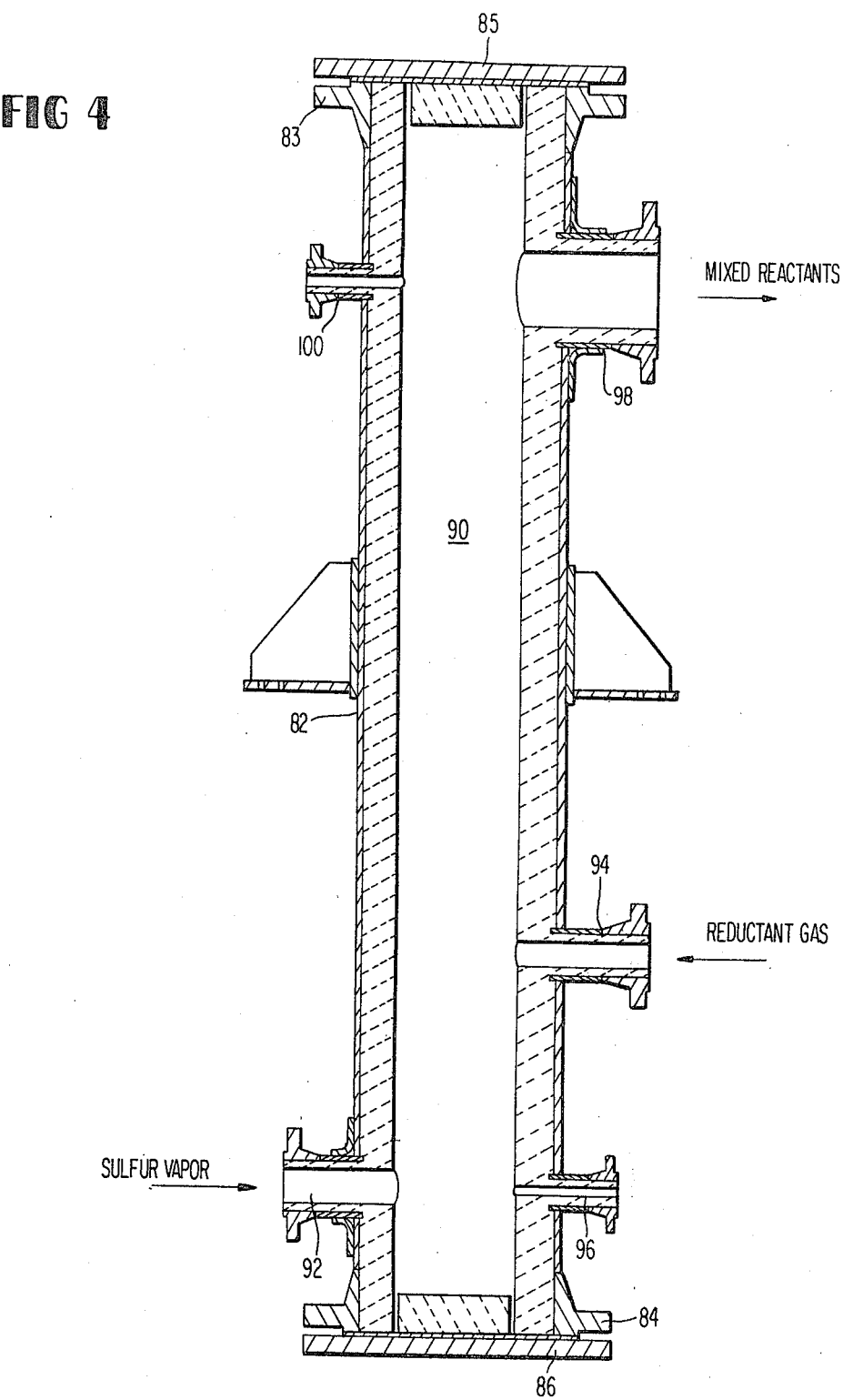

MANUFACTURE OF HYDROGEN SULFIDE

This invention relates to manufacture of hydrogen sulfide. More particularly, this invention is concerned with processes and apparatus for control of hydrogen sulfide manufacture in a system adaptable to manufacture of hydrogen sulfide from various reductant gas feedstocks.

In addition to the long established uses of hydrogen sulfide in metallurgical operations and in the manufacture of chemicals, a growing demand for hydrogen sulfide has developed for use in removing sulfur dioxide from industrial waste gases such as the effluent from electrical utility installations which burn sulfur-containing fuels.

For commercial purposes, a locally available source of hydrogen sulfide is preferred for such waste gas treatment uses. The present teachings facilitate manufacture of hydrogen sulfide at a wide range of industrial plant sites by providing a system adaptable to efficient production of hydrogen sulfide from reductant gases of widely differing properties while readily maintaining positive process control.

Hydrogen sulfide has been produced by bubbling hydrogen through liquid sulfur with sensible heat requirements being added at the reaction zone. Other processes limit reductant gases to those with levels of concentrations of carbon monoxide and/or hydrogen such that sufficient heat is generated to heat the reductant gas to reaction temperature. Such limitations on selection of reductant gases or the necessity of adding sensible heat for the sulfiding reaction by preheating the reductant gas are eliminated by the present invention.

A basic contribution of the invention is a system adaptable to sulfurization of various reductant feedstocks. Methane or other hydrocarbons, hydrogen, carbon disulfide, gases with high carbon monoxide contents such as those resulting from gasification of coal, or mixtures of these are examples of suitable gaseous reductants.

The optimum temperature for the sulfurization reaction is determined largely by the nature of the reductant gas. Being required to add sensible heat for the sulfiding reaction by heating the reductant gas, as taught in some prior practice, presents a safety hazard and could cause operating difficulties, e.g. coking can occur, when heating hydrocarbons significantly above 1000° F.

In accordance with the invention, sensible heat requirements are provided through separately fired means which facilitate process control. The incoming reductant gas can be used for heat recovery purposes, to improve process efficiency, as part of the invention. But, neither the requirements for sensible heat, nor control of heat input as taught, are placed on the reductant gas. Heat to initiate sulfurization of a reductant gas and/or to sustain such a reaction is supplied by superheating sulfur vapor and/or steam. An optimum sulfurization reaction temperature for a particular reductant gas is effectively and efficiently provided and controlled through sulfur vaporizing means.

The invention provides for modulation of the sulfurization reaction temperature by both direct control of heat input to the sulfur feedstock and quantitative control of liquid sulfur feed. Therefore, the invention includes methods and means to facilitate flow rate control of liquid sulfur as fed into the sulfur vaporizer means.

In addition, equipment and maintenance problems inherent in attempting to control movement of reactants and reaction products when at or near the relatively high reaction temperatures or sulfur vapor temperatures are eliminated. The system is arranged so that valves and other such mechanical implementation are located only in relatively low temperature regions; this contributes to reliability and long service life while minimizing maintenance requirements without inhibiting process control.

Figure 2:
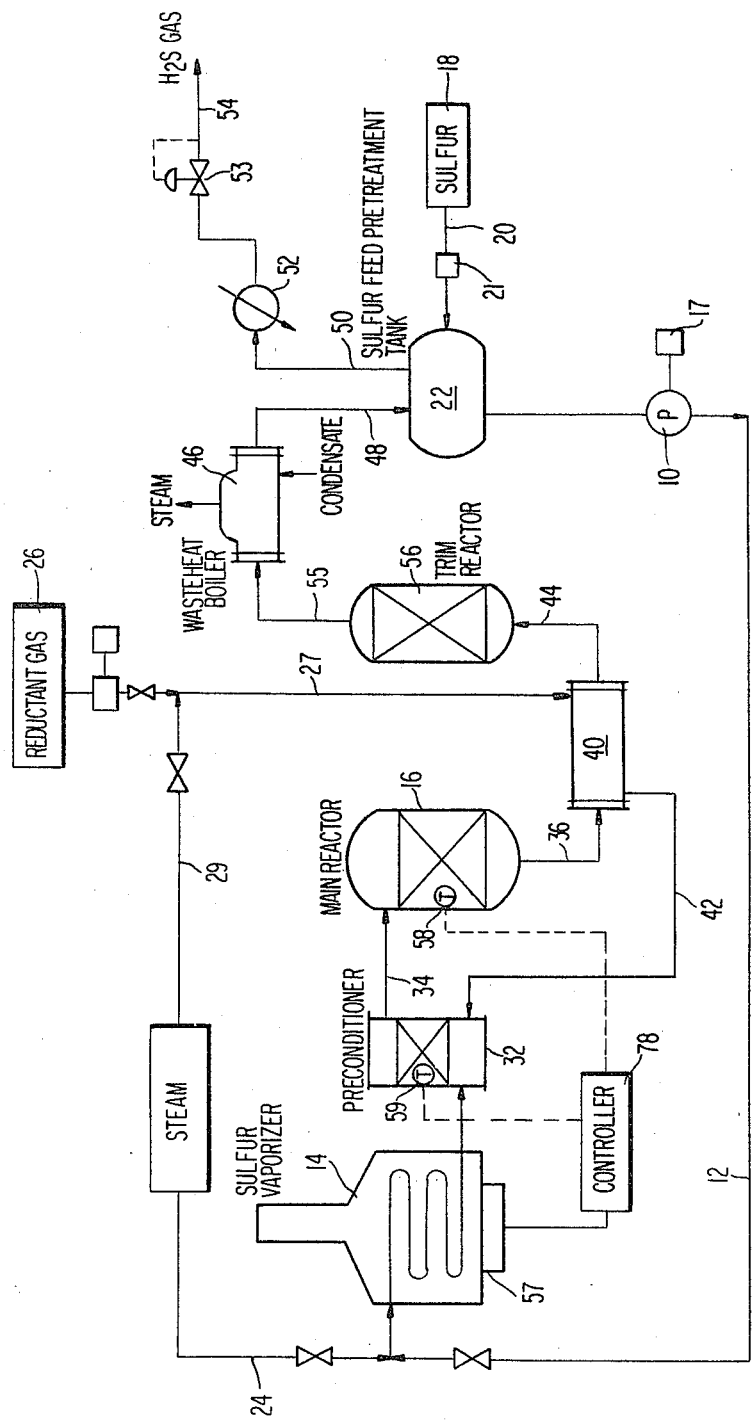
Figure 3:
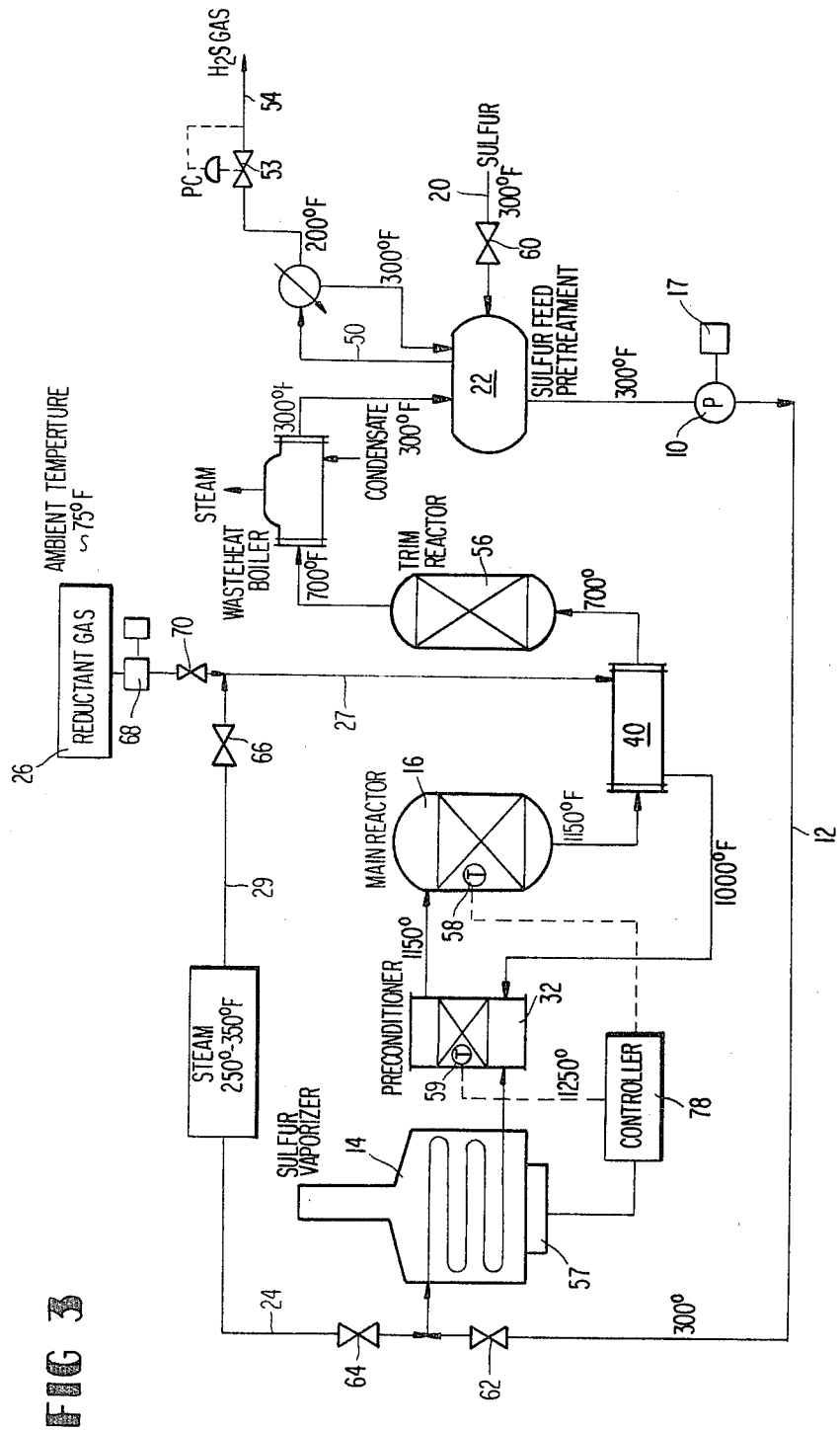

Other advantages and contributions are considered in a more detailed description of the schematic presentations of hydrogen sulfide producing systems; in the accompanying drawings:

FIG. 1 is a schematic diagram of a hydrogen sulfide producing system embodying the invention utilizing a single reaction zone, FIG. 2 is a schematic diagram of an embodiment of the invention utilizing multiple reaction zones operable at differing temperatures, FIG. 3 is a schematic diagram of an embodiment of the invention showing location of valves and other mechanical flow control equipment, with representative temperatures encountered, and FIG. 4 is an elevational cross-sectional view of preconditioner apparatus forming part of the invention for mixing and filtering reactants.

Examples of the chemistry involved in typical sulfurization reactions for a number of reductant gases are as follows:

$$CH_4 + 4S \rightarrow 2H_2S + CS_2$$

$$C_3H_8 + 10S \rightarrow 4H_2S + 3CS_2$$

$$H_2 + S \rightarrow H_2S$$

$$CH_3OH + 3S \rightarrow 2H_2S + COS$$

$$CO + S \rightarrow COS$$

Acceptable sulfurization reaction temperatures for production of hydrogen sulfide can vary with properties of the reductant gas. A sulfurization temperature above 800° F. to about 1350° F. can be utilized.

A reaction temperature of about 1150° F. is representative for most natural gas. Heat to initiate and sustain such a reaction is provided by adding heat of vaporization to the sulfur before introducing the sulfur for reaction and, also, by superheating the sulfur vapor before the reaction. Controlling heat input to a sulfur vaporizer provides a direct and effective control not otherwise available in prior practice.

Selection of and dependability of sulfur flow are important aspects of the invention. However, obstacles were encountered in achieving the desired flow control. These were found to be related to the viscous effect brought about in raising the temperature of liquid sulfur above about 300° F. To overcome these obstacles the invention teaches use of the cooled products of reaction to modify the liquid sulfur viscosity. Without such modification, the pressure differential encountered in heating liquid sulfur inhibits effective flow control of the liquid sulfur. This problem occurs when heating molten sulfur above 300° F. A sharp increase in viscosity is encountered near 315° F. As has been taught, the viscosity rises rapidly to a peak of about 93,000 centipoises at about 370° F. That the viscosity decreases with further heating to the boiling temperature does not alleviate the problem in a continuous process where liquid sulfur flow control is of interest as in the invention.

Treating the liquid sulfur while at a relatively low temperature enables the heat input and controls taught to achieve smooth continuous operation. This modification of the effects of liquid sulfur viscosity is accomplished by keeping the liquid sulfur feedstock substantially saturated with dissolved hydrogen sulfide by controlling contact of the liquid sulfur feedstock with the cooled product gases. Part of the hydrogen sulfide dissolved in the liquid sulfur is obtained from condensation of the excess sulfur vapor in the reaction product gases since such condensate is generally saturated with hydrogen sulfide. The remaining hydrogen sulfide additions are brought about by direct adsorption of hydrogen sulfide gas; cooled product gas can be sparged through the liquid sulfur feedstock for these purposes. With these teachings, a positive displacement pump can be utilized to facilitate effective selection and adjustment of sulfur feed.

In FIGS. 1, 2 and 3, similarly functioning structures are identified by the same reference numerals. Liquid sulfur feedstock is delivered by sulfur feed pump 10 through conduit 12 to sulfur vaporizer 14. A sulfurization reaction is carried out in reactor 16 of these figures.

Sulfur feed pump 10 can include an adjustable feed stroke to control the flow of molten sulfur. The pumping rate can therefore be readily adjusted at selector 17 dependent on the hydrogen sulfide production rate and the amount of excess sulfur desired in the reactions. Facilitating liquid sulfur pumping rates is also important to providing the reaction temperature modulation desired. Sulfur vapor temperature and the amount of sulfur are interrelated for the latter purpose.

Liquid sulfur feed from source 18 is introduced through feed line 20. Filter 21 removes ash and other solid impurities which would tend to deposit out in the vaporizer or which could otherwise adversely affect operations.

The liquid sulfur is treated for viscosity control purposes in sulfur feed pretreatment tank 22. Saturating the liquid sulfur with hydrogen sulfide eliminates the rapid rise in viscosity encountered during transition temperatures above 300° F. in heating liquid sulfur to vaporizing temperature.

The sulfur vaporizer 14 is a fired process heater for boiling and superheating the sulfur. Direct control of superheat temperature is facilitated by control of combustible fuel input.

A large diameter heating coil is preferred to help compensate for internal build-up of metal sulfide scale. Also, the entrance portion of the coil can be designed for maximum heat transfer rate to help shorten heating time during which the rapid rise in viscosity and the obstructing effects of high viscosity would ordinarily be expected in the vaporizer.

The adaptability of the system is increased by providing for the addition of steam from conduit 24 through the vaporizer 14. Superheating the steam in vaporizer 14 can provide additional heat for initiating and sustaining the sulfurization reactions. Introducing heat by superheating steam permits placing a reasonable limit on the upper temperature requirement of the sulfur within desired quantitative limitations placed on the excess sulfur; this in turn can increase tube life in the vaporizer.

Vaporizer 14 can provide for preheating of the system and the system can be purged with steam from vaporizer 14 before start-up. Vaporizer 14 thus enables a hydrogen sulfide installation to be self-contained in the sense of eliminating any requirement for a separate steam producing means for start-up or otherwise since a steam producing coil can readily be added within the vaporizer heating chamber to provide a source of steam for the system.

The reductant gas is added from a source 26 through conduit 27. Provision is also made for addition of steam with the reductant gas through line 29. Steam additions for chemical reaction purposes can be made with either the sulfur vapors or the reductant gas. When made with the reductant gas, steam addition can be utilized to moderate heating of the gas as desired.

Superheating of the sulfur vapor is controlled in vaporizer 14 responsive to operating requirements in reactor 16. Superheating at pressures several times atmospheric is ordinarily used; lower pressures can improve conversion in lower temperature reactions.

System operating pressure is established by pressure control in the product gas removal conduit. The pressure of the reductant gas supply can influence selection of system operating pressure when the gas at a particular site is available at a suitable operating pressure. The system operating pressure determines the pressure of sulfur vapors delivered by vaporizer 14. In general, the system is operated at pressures between about two and about five atmospheres.

In accordance with the invention, the reductant gas and sulfur vapor are mixed thoroughly in a preconditioner vessel 32. This vessel can perform a filtering function for entrained particulate, scale, carbon, and ash, prior to introduction of the mixed reactants through conduit 34 into the reactor vessel. The premixing of differing temperature reactants reduces strain in the catalytic reaction zone and facilitates the reaction and its control.

Reactor 16 includes a reaction zone filled with a catalyst supported to allow desired contact and passage of reactants and reaction products. The reaction products are delivered over conduit 36 and passed in heat exchange relationship with the reductant gas being introduced to the process through heat recovery unit 40. Heat recovery aids efficiency. However, heating of any reductant gases to a temperature likely to cause coking is avoided and is not required since the heat input source for any sensible heat requirements for the system is at vaporizer 14. Conduit 42 conveys the reductant gas heated from heat recovery unit 40 into mixer 32.

In practice of the invention, sulfur vapor is introduced into the process in excess of that required stoichiometrically in order to insure maximum possible conversion of the reductant feedstock and to reduce or eliminate hydrogen in the product gases. Control of sulfur vapor temperature along with quantitative control of sulfur feed are used to modulate reaction temperatures so as to maintain such temperature within an optimum range. When reaction temperatures must be moderated, the extent of superheating the sulfur in vaporizer 14 is adjusted. The sulfur vapor can also be used to maintain desired reaction temperatures during process turndowns.

When relatively pure hydrogen is available as the reductant gas, the product gases from reactor 16 in FIG. 1 comprise hydrogen sulfide and excess sulfur in vapor form. In completing the process, the excess sulfur is removed from the product gases and the hydrogen sulfide is delivered for desired usage.

Under such circumstances and when the conversion of the reductant gas is sufficient in the main reactor, without further reaction being required to produce acceptable product, the product gases can be directed to cooling means and then to the pretreatment tank 22.

In the embodiment of FIG. 1, waste heat boiler 46 is used to cool the product gases which can exit from recovery unit 40 at a temperature around 700° F.–900° F. Conduit 44 directs product gases to waste heat boiler 46 which reduces the temperature of the product gases to approximately 300° F. Condensed sulfur, which is likely to be saturated with hydrogen sulfide, can be directed into pretreatment tank 22 as previously described. For most steady state conditions, a temperature of about 300° F. is preferred for the liquid sulfur feedstock. The heat from condensation of sulfur vapor is used to generate steam in the waste heat boiler 46. Part of the heat recovered in heat recovery unit 40 can also be used to generate steam.

The reaction gas, containing hydrogen sulfide, passes through an internal mist separator in pretreatment tank 22 and hydrogen sulfide is delivered over conduit 50 for additional cooling (to about 200° F.) in product cooler 52 where sulfur vapor is removed. The hydrogen sulfide gas is delivered through pressure control valve 53 in conduit 54.

The adaptability of the system enables use of reductant gases readily and economically available at the particular installation. Carbon containing reductants (e.g. paraffinic hydrocarbons) can form carbon-sulfur compounds, generally in excess of acceptable levels, in the main reactor 16. Hydrolysis of carbon-sulfur compounds is carried out in accordance with the following formulae:

$$CS_2 + 2H_2O \rightarrow 2H_2S + CO_2$$

$$COS + H_2O \rightarrow H_2S + CO_2$$

Steam additions are required for such hydrolysis reactions and steam is introduced with the sulfur vapor and/or the reductant gas reactant. Adding steam via conduit 24 through vaporizer 14 has additional utility in providing an additional means for establishing and maintaining the desired temperature for the reaction in the reactor 16. Adding steam through conduit 27 has an added benefit in controlling the temperature of the reductant gas.

The reactions can be regulated within the main reactor 16 with sulfurization and hydrolysis reactions occurring to produce satisfactory product for many uses in a single reaction zone. However, for process adaptability and increased hydrogen sulfide conversion efficiency, a trim reactor 56, as shown in FIG. 2, is provided in the conduit between the heat recovery unit 40 and the waste heat boiler 46; conduit 58 connects trim reactor 56 to waste heat boiler 46.

Hydrolysis reactions can occur at temperatures as low as 500° F. In trim reactor 56 hydrolysis is carried out so that sulfur remains in the vapor state. The temperature is selected to accomplish the hydrolyzing reaction sufficiently above the dew point of the sulfur vapors.

The product gases from trim reactor 56 after hydrolyzing reactions include primarily hydrogen sulfide, excess sulfur vapor, excess water vapor, and $CO_2$. These are directed over conduit 55 to waste heat boiler 46. Cooling the product gases to 300° F. condenses sulfur vapors. Product gases and condensed sulfur are directed, as previously described, to pretreatment tank 22. After additional cooling in product gas cooler 52, the product gases can be treated further to produce substantially pure hydrogen sulfide.

The gas resulting from coal gasification comprises largely carbon monoxide and hydrogen; when this gas is used the sulfur vapors are only slightly superheated and are added in excess of requirements, typically at percentages of 100% above stoichiometry, or higher.

A control objective is to hold temperatures in the sulfurization reaction zone near the desired optimum. A reaction temperature is selected and the process regulated with the quantity of sulfur feed and the temperature of the vaporized sulfur (or steam) to hold reaction temperature within the desired temperature range. The reaction temperature is monitored and the heat input to vaporizer 14 can be controlled responsively to maintain sulfur vapors within an optimum temperature range.

In a control procedure utilizing simplified control implementation, the sulfur feed rate is set at a preselected level and the temperature of the vaporized sulfur (and steam) is controlled by operation of fuel burners for vaporizer heat source 57. When smooth operations have been established, with the reaction zone temperature in the optimum range, the sulfur vapor temperature is monitored and used to control combustible fuel input to the fuel burner. Monitoring sulfur vapor temperature for this purpose has the advantage of fast response. Reaction zone temperature, which has a slower time response because of the mass of materials involved, is indicated and recorded. Process control apparatus for more sophisticated automated control is readily available in the art and adaptable based on operational data.

The properties of sulfur enable it to exercise greater temperature control than steam but there are practical limits on the amount of excess sulfur that should be added, as discussed above. Also, in order to avoid raising the vaporizer tube temperature to levels which are unduly detrimental to service life, steam can be added for temperature modulation purposes in addition to its function in hydrolysis reactions.

Typically, the reaction bed in the main reactor (16) is a catalyst material consisting of zirconium aggregate or activated alumina. A qualification on the type of activated alumina used in such primary reactor is that it have high crushing strength which will not degrade at the high temperatures which can be required. Activated alumina catalyst would typically be used in the trim reactor bed. The reactors are refractory lined to minimize heat loss through vessel shells.

Reaction zone temperatures are measured by temperature sensors such as 58 in reactor 16. Because of the response time lag mentioned, it is preferred to monitor the sulfur vapor temperatures at temperature sensor 59 in the premix and conditioning vessel 32.

As shown in FIG. 3, valving and other mechanical flow control implementation are located in relatively low temperature zones. Positive pressure flow is exercised in the high temperature areas without mechanical flow control implementation in such areas.

Flow control means can typically include pumps and valves. For example, in FIG. 3 valve 60 is located in sulfur feed line 20; valve 62 is located in the liquid sulfur feed line 12 between sulfur feed pump 10 and vaporizer 14; valve 64 is located in steam line 24 and valve 66 is located in steam line 29. Reductant gas is provided at available temperatures and pressures or, pump compressor 68 can provide desired pressures of 50-75 psig. Pressure control valve 70 located in reductant gas feed line 27 introduces reductant gas to the process at or above the system pressure established through pressure control valve 53 in product gas delivery conduit 54; a representative system pressure is 35 psig.

Reactants are fed into the system and reaction products fed through the system at pressures above atmospheric pressure as described above and shown in FIG. 3 while limiting mechanical implementation to relatively low temperature regions. The pressure at any given point is established by pressure loss through the system and the back pressure maintained by pressure control valve 53. Flow control between high temperature elements, e.g. from the mixer 32 to the reactor 16, is achieved without mechanical flow control implementation in such high temperature regions.

In a representative operation, liquid sulfur is delivered by controlling the feed stroke of sulfur feed pump 10. Sulfur vapor temperature is monitored and controlled through heat input source 57 for sulfur vaporizer 14. Liquid sulfur is delivered as required and sulfur vapor temperature controlled to maintain the reaction zone temperature in reactor 16 within a desired range. The temperature sensor probe 59 in preconditioner 32 provides an input to controller 78 for burner control of heat input source 57. While liquid sulfur feed can be set manually by adjusting the feed stroke of pump 10, sulfur feed rate and sulfur vapor temperature can be integrated and automated. Such mechanical flow control implementation, sensors, and electronic processors are available commercially and their use in the light of the above teachings is within the skill of the art so that no further description of these devices is required for an understanding of the invention.

The temperatures shown in FIG. 3 for sulfur vapors, main reactor input and output, reductant gas temperature, and trim reactor temperatures are representative for a natural gas reductant and can vary when the system is adapted for other reductants. The relatively low temperatures shown at regions for mechanical flow control equipment are typical with other types of reductant gases.

Preconditioner mixer vessel 32 is shown in greater detail in FIG. 4. Vessel 32 comprises shell wall 82 with flanges 83, 84 at opposite longitudinal ends for attachment and removal of flanged access doors 85, 86. Refractories 88 line the shell and help define chamber 90 which, during usage, is filled with ceramic shapes (not shown).

Sulfur vapors are introduced at entry port 92 and reductant gases at entry port 94. The temperature probe for monitoring sulfur vapor temperature can be mounted through port 96.

The ceramic shapes in chamber 90 help absorb the thermal shock of mixing sulfur vapor and reducing gas reactants which can be introduced at widely differing temperatures. The ceramic shapes also insure complete mixing of the reactants during upward passage and help remove particulates such as metal sulfides. The ceramic shapes can be readily removed and replaced through the access doors 85, 86.

Mixed reactants are delivered through exit port 98. A temperature probe can be mounted in port 100 to monitor the temperature of the mixed reactants.

The main reactor 16, in which a sulfurization reaction takes place, is preferably designed with a large diameter catalyst bed to reduce pressure drop. Catalyst is supported in the reaction zone by ceramic shapes. The reactor shell, as with the preconditioner vessel, can be constructed of stainless steel and is refractory lined. Refractory thickness is selected to hold shell temperature to less than 300° F.

The heat recovery unit 40 which removes heat from the gases discharging from the main reactor by preheating reductant gas (and steam) can be designed as a single pass shell and tube arrangement with hot reactor gases on the tube side. Piping and connections are refractory lined. Sufficient heat transfer surface is provided to cool the gases discharging from the main reactor to temperatures desired in the trim reactor. Any sulfur vapor condensate can be removed in a sulfur dropout leg to minimize clogging problems in the remainder of the system.

The trim reactor vessel, which can be used to increase conversion to hydrogen sulfide by hydrolysis reactions, is refractory lined and typically contains an activated alumina catalyst. The trim reactor is generally operated at about 700°-900° F. with refractory linings controlling heat losses.

In a typical example of carrying out the process in the embodiment of FIG. 1, natural gas and steam were reacted with vaporized elemental sulfur in a catalyst bed containing 3 cubic feet of 4 to 10 mesh zirconium aggregate. The reaction temperature was maintained at about 1050° F. by using between 150 and 300 percent excess sulfur. To minimize formation of carbonyl sulfide, 25 percent excess steam was provided. Sulfur vapor and reductant gas were provided for operations at about thirty (30) psig outlet pressure. The composition of the natural gas was approximately 92 percent methane and 6 percent heavier hydrocarbons. The natural gas flow rate was 3.96 SCFM and the combined reactants provided a space velocity of 470 hour$^{-1}$ with a residence time of 2.3 seconds. The excess sulfur in the reactor product gas was removed by condensation and the analysis on a dry mole basis was 78 percent $H_2S$, 18 percent $CO_2$, 1.5 percent COS and 0.6 percent $CH_4$. The balance in the gas analysis was primarily $N_2$ (from the natural gas) with trace amounts of $CS_2$ and CO. Process conditions in the reactor permitted the sulfurization and hydrolysis reactions to occur in the same catalyst bed.

The reactor product gas from the first example was cooled and condensed sulfur removed. The gas was then passed into a trim reactor containing 2.5 cubic feet of activated alumina in the form of ¼ inch spheres. This provided a space velocity of 500 hour$^{-1}$ and a residence time of 3.95 seconds. The trim reactor product gas had a composition on dry mole basis of 79 percent $H_2S$, 19 percent $CO_2$, 0.4 percent COS, and 0.6 percent $CH_4$. The use of a trim reactor demonstrates that the COS content can be reduced by further hydrolysis to hydrogen sulfide at temperatures lower than the initial sulfurization reactions.

Using the same reactor described in the first example, the use of propane, methanol, and carbon monoxide reductant gases was demonstrated. Steam was added to the reductant gas prior to entering the reactor so that hydrolysis also occurred in a single catalyst bed. Sulfur was provided at about 300 percent excess in the reactions for propane and for methanol, and at about 700 percent excess for the reaction with carbon monoxide. The steam rate was at 50 percent excess for propane, 100 percent excess for methanol, and 150 percent excess for carbon monoxide. The following table summarizes operation and results:

| Reductant Feed | Main Reactor Temp. °F. | | Dry Product Analysis, % | | | |
|---|---|---|---|---|---|---|
| | In | Out | $H_2S$ | $CO_2$ | COS | $CS_2$ |
| Propane | 1,080 | 1,030 | 76.1 | 20.2 | 1.7 | 1.4 |
| Methanol | 1,100 | 1,100 | 74.2 | 21.6 | 2.6 | 0 |
| Carbon Monoxide | 1,000 | 1,050 | 50.1 | 46.8 | 2.2 | 0 |

Various process control parameters and values have been set forth to provide an understanding of the invention and control equipment described in disclosing the invention. However, in the light of the above teachings, other process control parameters and values and other flow control apparatus can be utilized by those skilled in the art to effect desired process control. Therefore, for purposes of determining the scope of the present invention, reference should be made to the appended claims.

We claim:

1. Apparatus for producing hydrogen sulfide by reaction of sulfur with a gaseous sulfur reductant feedstock selected from various sulfur reductant feedstocks including hydrogen, hydrocarbons, carbon-containing gases such as carbon monoxide, and mixtures thereof, comprising in combination an interconnected system for combining sulfur, sulfur reductant feedstock and steam for reaction to produce hydrogen sulfide, a source of gaseous sulfur reductant feedstock having a predetermined temperature, vaporizer and superheater means including separately controllable heat source means for vaporizing liquid sulfur and superheating such sulfur vapors, means for supplying liquid sulfur at a predetermined temperature, means for delivering such liquid sulfur into the vaporizer and superheater means, means for quantitatively controlling delivery of liquid sulfur to the vaporizer and superheater means, means for supplying steam at a predetermined temperature, means for introducing steam into the vaporizer and superheater means to be superheated with the sulfur vapors, means for introducing steam with the sulfur reductant feedstock, means for delivering sulfur vapors, steam and sulfur reductant feedstock into a vessel means for premixing sulfur vapors, steam and sulfur reductant feedstock before introduction into a catalytic reaction zone, catalytic reaction means connected to such premixing vessel means for receiving and reacting sulfur vapors, steam and sulfur reductant feedstock to produce reaction product including hydrogen sulfide, means for controlling such heat source means to control heat input into the vaporizer and superheater means to balance the heat input into the catalytic reaction means from the steam, sulfur and sulfur reductant feedstock, means for cooling reaction product, means for delivering reaction product from the catalytic reaction means to the means for cooling reaction product, and means for delivering cooled reaction product including hydrogen sulfide from the means for cooling reaction product.

2. The apparatus of claim 1 including means for measuring temperature in such premixing vessel means, such temperature measuring means being interconnected to such means for controlling the heat source means for the vaporizer and superheater means for responsive control of such heat source means.

3. The apparatus of claim 1 including means for delivering liquid sulfur to a pretreatment means, liquid sulfur pretreatment tank means for treating the liquid sulfur prior to heating of such liquid sulfur in the vaporizer and superheater means, and means for delivering cooled reaction product including hydrogen sulfide into the liquid pretreatment tank means for contact of cooled reaction product with the liquid sulfur in the pretreatment tank means.

4. The apparatus of claim 1 in which the means for quantitative control of delivery of liquid sulfur to the vaporizer and superheater means includes adjustable pump means.

5. The apparatus of claim 1 in which the catalytic reaction means includes at least two reaction zones.

6. The apparatus of claim 1 in which mechanical means for controlling flow of reactants and reaction product comprises flow control means in the means for supplying liquid sulfur, flow control means in the means for introducing sulfur reductant feedstock into the system, flow control means in the means for introducing steam into the system, and flow control means in the means for delivering cooled reaction product including hydrogen sulfide from the system.

* * * * *